United States Patent [19]

Gullichsen et al.

[11] 4,435,193
[45] Mar. 6, 1984

[54] CONTROLLING OPERATION OF A CENTRIFUGAL PUMP

[75] Inventors: Johan E. Gullichsen, Siuntio, Finland; Esko Harkonen, Karlstad, Sweden; Toivo Niskanen, Hamina, Finland; Jaakko Kujala; Voitto Reponen, both of Karhula, Finland

[73] Assignee: Kamyr AB, Karlstad, Sweden

[21] Appl. No.: 439,600

[22] Filed: Nov. 5, 1982

Related U.S. Application Data

[63] Continuation-in-part of Ser. No. 139,162, Apr. 7, 1980, Pat. No. 4,410,337.

[51] Int. Cl.³ .............................................. B01D 19/00
[52] U.S. Cl. .......................................... 55/21; 55/52; 55/190; 55/203; 55/409; 162/55
[58] Field of Search ................. 55/21, 41, 52, 171, 55/182, 184, 190, 191, 199–203, 206, 408, 409; 162/55; 415/204

[56] References Cited

U.S. PATENT DOCUMENTS

| | | | |
|---|---|---|---|
| 1,143,957 | 6/1915 | Hansen | 55/199 |
| 1,926,546 | 9/1933 | Lampen | 162/55 X |
| 1,993,944 | 3/1935 | Peebles | 55/199 X |
| 2,216,542 | 10/1940 | Paige | 55/199 X |
| 2,575,568 | 11/1951 | Topanelian, Jr. | 55/199 |
| 2,737,857 | 3/1956 | Lee | 55/199 X |
| 3,323,465 | 6/1967 | Stillebroer | 415/204 |
| 3,407,569 | 10/1968 | Hendricks | 55/52 |
| 3,597,904 | 8/1971 | Jakobsson et al. | 55/408 |
| 3,686,831 | 8/1972 | Libby | 55/199 |
| 4,201,555 | 5/1980 | Tkach | 55/52 X |
| 4,209,359 | 6/1980 | Sethy | 55/52 X |

FOREIGN PATENT DOCUMENTS

| | | | |
|---|---|---|---|
| 2920337 | 12/1979 | Fed. Rep. of Germany | 162/55 |
| 2479870 | 10/1981 | France | |
| 363363 | 1/1974 | Sweden | |
| 571655 | 1/1976 | Switzerland | |
| 558691 | 5/1975 | U.S.S.R. | 55/203 |
| 690105 | 10/1979 | U.S.S.R. | 162/55 |

Primary Examiner—Robert H. Spitzer
Attorney, Agent, or Firm—Cushman, Darby & Cushman

[57] ABSTRACT

The operation of a centrifugal pump which pumps a liquid or suspension (e.g. 8–12 percent consistency) containing gas is controlled to minimize pump power consumption, or to vary the pump flow rate. The suspension is rotated within the pump so that a gas bubble is created at a central part of the pump, and gas is discharged from the gas bubble, at a gas discharge pressure. The differential pressure between the suspension inlet and the gas discharge is determined, and the head and/or discharge flow rate of the pump are controlled by controlling the differential pressure so determined. The discharge flow rate may be maintained constant utilizing a control valve and flow meter in the pump discharge line, in which case controlling the discharge of gas from the gas bubble controls the head, and minimizes power consumption for a given flow rate. Alternatively the flow rate is controlled by controlling the gas discharge, with no control valve in the pump discharge line being provided.

25 Claims, 5 Drawing Figures

CONTROLLING OPERATION OF A CENTRIFUGAL PUMP

CROSS REFERENCE TO RELATED APPLICATION

This application is a continuation-in-part of application Ser. No. 139,162 filed Apr. 7, 1980, now U.S. Pat. No. 4,410,337, the disclosure of which is hereby incorporated by reference herein.

BACKGROUND AND SUMMARY OF THE INVENTION

The invention relates to a method and apparatus for controlling the operation of a centrifugal pump pumping a liquid or a suspension, particularly a cellulosic fiber suspension having a consistency of about 8-12 percent, with gas entrained in the liquid or suspension. Gas, such as air, entrained in liquids or suspensions tends to separate from the liquid or suspension in centrifugal pumps, and creates a gas bubble. The bubble can slowly grow and eventually fill the entire interior of the pump occupied by the impeller, resulting in cavitation or other adverse consequences. One manner of avoiding this problem is disclosed in parent application Ser. No. 139,162, now U.S. Pat. No. 4,410,337; in that disclosure an apparatus and method are provided whereby gas is discharged from the pump interior. A valve is disposed in the gas discharge line, and the rate of gas discharge is controlled in response to the measured pressure difference between the liquid or suspension inlet pressure and the gas exhaust pressure.

Utilizing some of the basic techniques provided in the parent application, it has been unexpectedly found that it is possible to control the function of a centrifugal pump to affect the flow rate/pressure head curve (the Q/H curve, Q equals the pump discharge flow rate, preferably expressed in liters per second, and H equals the pressure head, preferably expressed in bars). By changing the size of the air bubble it is possible to control the Q/H curve in the same way that a speed control may be utilized to control a conventional centrifugal pump. This finds great utility especially where paper pulp, or like suspensions, having a relatively high consistency (e.g. about 8-12 percent) are being pumped, because at low speeds it is not possible to effect fluidization of the pulp, so that the pump—in order to be operative—must always operate at a relatively high speed (e.g. 3,000 rpms). By proper practice of pump control according to the invention it is possible to greatly reduce the energy consumption of a centrifugal pump for pumping a liquid or suspension at a given flow rate Q, and a number of other desirable results are also achievable.

According to one aspect of the present invention a method of controlling the operation of a centrifugal pump pumping a liquid or suspension containing gas is provided, the pump having an inlet liquid or suspension pressure, a pressure head, and a liquid or suspension discharge flow rate. The method comprises the steps of: Effecting rotation of the liquid or suspension within the pump so that a gas bubble is created in a central part of the pump. Discharging gas from the gas bubble in the pump central part, at a gas discharge pressure. Determining the differential pressure between the liquid or suspension inlet pressure and the gas discharge pressure. And, controlling the head and/or discharge flow rate of the pump by controlling the differential pressure between the liquid or suspension inlet pressure and the gas discharge pressure. The differential pressure is controlled by controlling the discharge rate of the gas, and by determining the pressure head H and varying the set point for a dP-controller in response to the pressure head, proper control of the differential pressure between the liquid or suspension inlet pressure and the gas discharge pressure is provided. Practicing the invention it is possible to maintain the pump speed and pump flow rate Q constant while substantially reducing the power consumption. Q may be maintained constant by determining the liquid or suspension discharge flow rate at a particular point in a discharge line from the pump, and responsive to that flow rate controlling a valve upstream of the sensing point to keep the flow rate constant. Alternatively, it is possible to vary the flow without utilizing a control valve in the pump discharge. A control valve in the pump discharge creates a relatively high back pressure. According to the invention once the Q/H curve is known, it is possible to control the flow utilizing only a dP-controller.

According to another aspect of the present invention, a cellulosic fiber suspension having a consistency of about 8 to 12 percent, and having gas entrained therein, is readily pumped utilizing a centrifugal pump. The impeller is rotated at a speed sufficient to effect fluidization of the suspension, and the differential pressure between the suspension just prior to fluidization and the gas being discharged is determined. The rotational speed of the pump is maintained substantially constant, and the discharge rate of the flow of fluidized suspension is maintained substantially constant. The power consumption of the pump is significantly reduced at any particular rotational speed (as long as high enough to effect fluidization) and discharge flow rate by controlling the pump head, which is accomplished by controlling the differential pressure between the suspension just prior to fluidization and the gas being discharged.

It is the primary object of the present invention to provide a method and apparatus for effecting the advantageous control of the operation of a centrifugal pump. This and other objects of the invention will become clear from an inspection of the detailed description of the invention and from the appended claims.

DETAILED DESCRIPTION OF THE DRAWINGS

Figure 1:
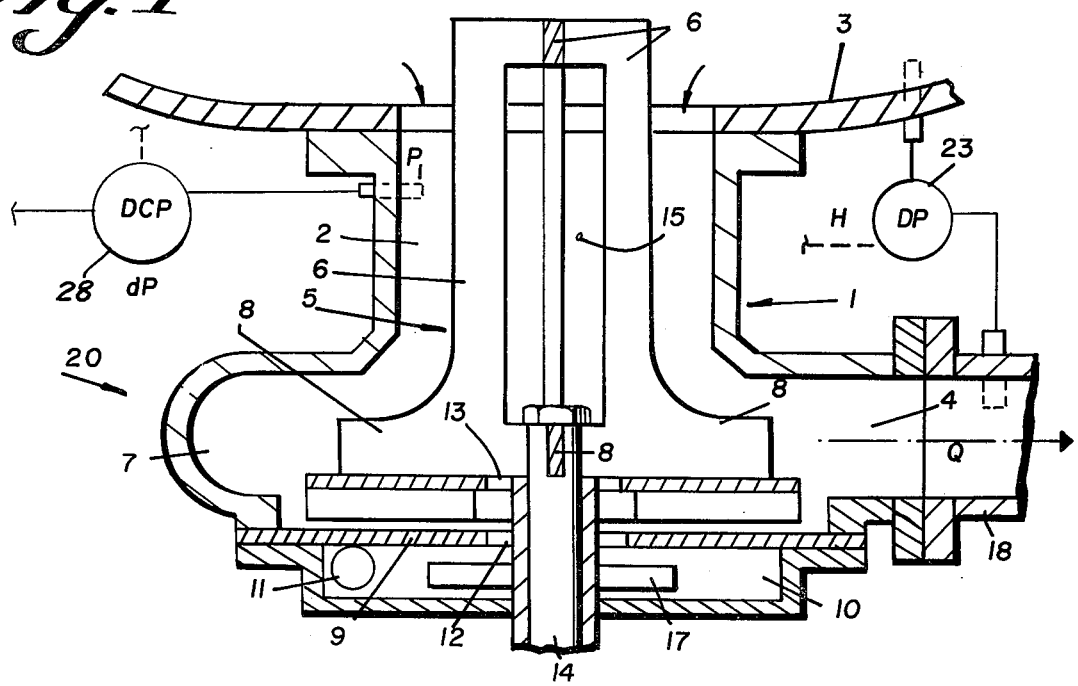
FIG. 1 is a schematic side view, partly in cross-section and partly in elevation, of an exemplary centrifugal pump, connected up to a liquid or suspension supply vessel, which may be controlled according to the present invention.

The centrifugal pump 20 illustrated in FIG. 1 is described in detail in the parent application Ser. No. 139,162, now U.S. Pat. No. 4,410,337. Basically it preferably comprises a housing 1 having a liquid or suspension inlet channel 2, connected to a liquid or suspension container 3 (e.g. a container housing pulp at about 8-12 percent consistency). An outlet channel 4 from the housing 1 is connected to a pump liquid or suspension discharge 18.

Rotor 5 is mounted for rotation in the housing 1, and includes a plurality of axially extending blades 6, which have an interior opening 15 therebetween. The rotor also includes pump impeller blades 8, which are radially extending and rotate in the spiral housing section 7. A gas chamber 10 is disposed immediately below the spiral section 7, and gas from the interior of the pump can pass through openings 12 and 13 into the chamber 10, which is separated by stationary partition wall 9 from the spiral housing portion 7. Blades 17 may be mounted on, and rotatable with, the shaft 14 within the air chamber 10 for purposes as described in the parent application. Extending from the air chamber 10 is a gas discharge conduit 11.

Figure 2:
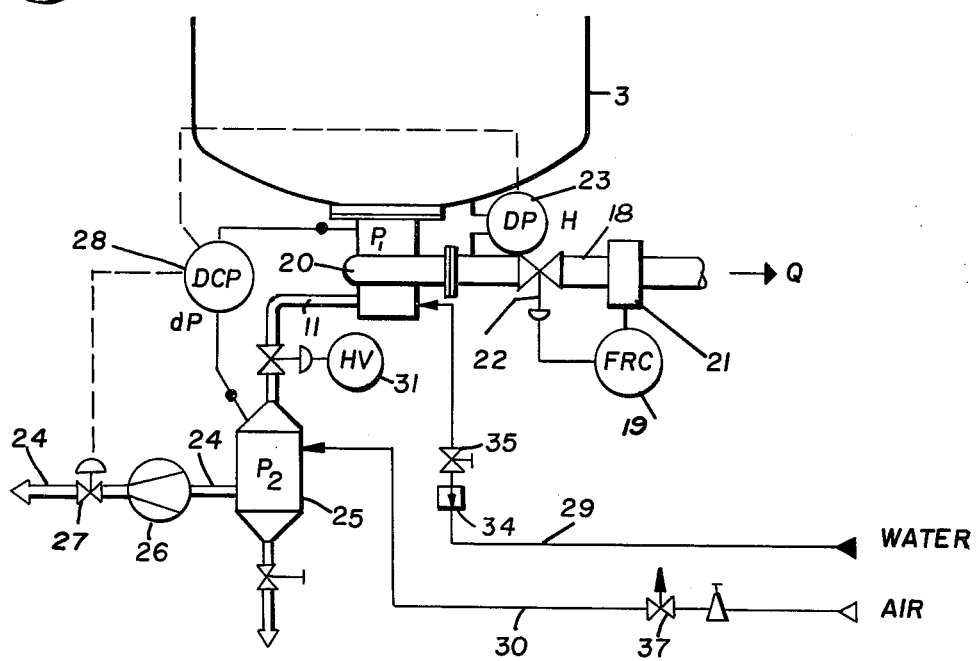
FIG. 2 is a diagramatic view illustrating components of an exemplary system for effecting advantageous control of the centrifugal pump of FIG. 1.

As illustrated in FIG. 2, the gas discharge conduit 11 leads to an air vessel 25, with a shutoff valve 31 disposed in the conduit 11. From air vessel 25 a conduit 24 leads to a conventional vacuum pump 26, or like suction source, with a metering structure, such as automatically controlled valve 27, disposed downstream of the vacuum pump 26 for metering the amount of gas drawn therethrough.

A water pipe 29 is preferably operatively connected through a check valve 34 to the air chamber 10. Upon opening of the valve 35 water can flow through the pipe 29 to flush out the air chamber 10, removing any accumulated undesirable materials therefrom.

In the embodiment illustrated in FIG. 2, an automatically controllable valve 22 is disposed in the discharge line 18. A flow meter 21 is disposed in the line 18 downstream of the valve 22, and a flow controller 19 adjusts the position of the valve 22 in response to the reading from flow meter 21 to maintain the flow at any desired value.

According to the present invention a conventional dP-instrument 23 is operatively connected between the discharge conduit 18 and the vessel 3. The instrument 23 thus measures the head H of the pump 20. The reading from the instrument 23 is used to control the set point for conventional dP-controller 28. The dP-controller 28 is operatively connected to the pump inlet 2 ($P_1$) and operatively connected to the gas discharge 11 ($P_2$) to measure the differential pressure therebetween ($dP = P_1 - P_2$). In response to this determined differential pressure, the controller 28 controls the valve 27 so that the set point determined by the head H sensed by instrument 23 is substantially maintained; i.e., so that H is maintained at a desired value.

The functionality of the system illustrated in FIG. 2 is enhanced by providing the sensing point for $P_2$ within the air vessel 25. In this way it is possible to provide pressure and flow rate controlled air from conduit 30, flowing through flow-adjusting valve 37, to the vessel 25. This is especially useful at start up and when a rapid differential pressure change is required.

Figure 5:
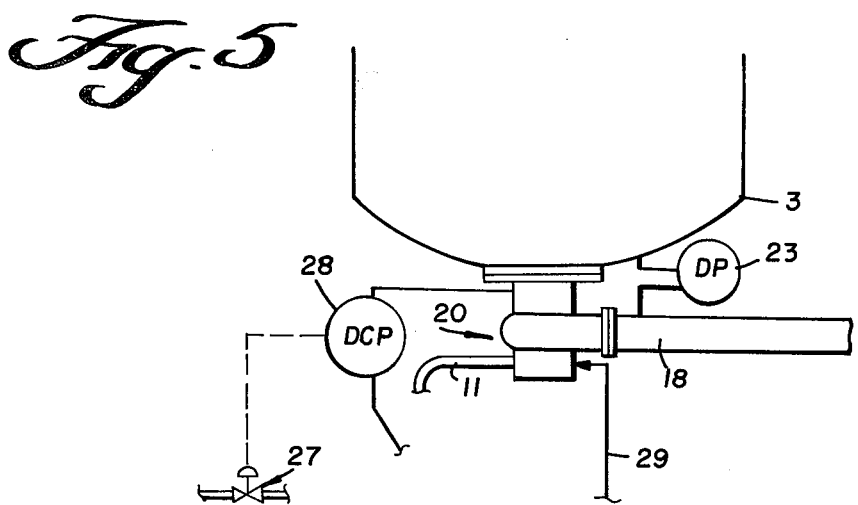
FIG. 5 is a view like that of FIG. 2, illustrating a slightly modified system.

FIG. 5 illustrates a schematic of a system according to the present invention wherein the control valve 22 in the discharge conduit 18 is eliminated. In this arrangement, the control of the flow rate Q is accomplished by controlling the rate of gas withdrawal through conduit 11. In the FIG. 2 system it is the head H which is controlled by the gas withdrawal, the flow rate being maintained constant.

As examples of advantageous operational results achieveable according to the present invention, attention is directed to the following.

EXAMPLE 1

A pump 20 according to FIG. 1 which has a control system according to FIG. 2 pumps pulp at a consistency of about 10-12 percent from a storage tower 3 to a chlorination tower (not shown). The pump has a nominal pressure head H of 7.5 bars (the back pressure in this case is only 3.5 bars). The pressure loss at the control valve 22 is about 4 bars (7.5-3.5) and the valve 22 is open only 30°. The pressure difference dP ($P_1 - P_2$) under these circumstances is about 4 mWc (meter water column) and the power consumption is about 90 kW. By lowering dP—by controlling valve 27 to about 2.5 mWC—the following comparative results can be seen for 10 percent consistency pulp:

| Parameter | Units | Case A | Case B |
|---|---|---|---|
| Pump speed | rpm | 3000 | 3000 |
| Q (Flow rate) | l/s | 46 | 46 |
| dP (Pressure difference) | mWc | 4 | 2.5 |
| H (Pressure head) | bars | 7.5 | 4.5 |
| Pump Power consumption | kW | 90 | 65 |
| Control valve 22 position | degrees | 30 | 70 |
|  | degrees | 30 | 70 |

Figure 3:
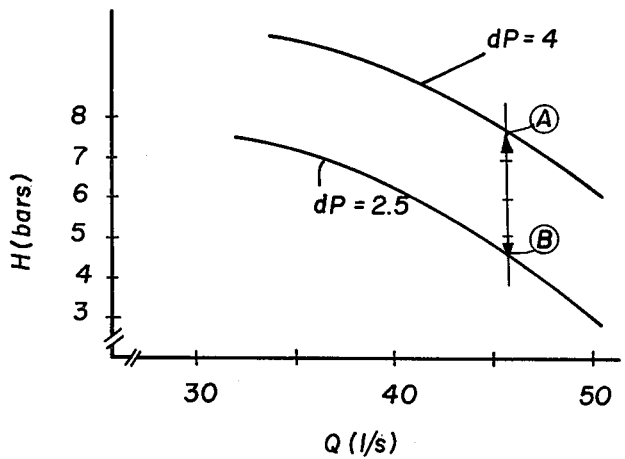
FIGS. 3 and 4 are graphical representations of the manner in which various parameters are controlled, and respond, in practicing the invention.
Figure 4:
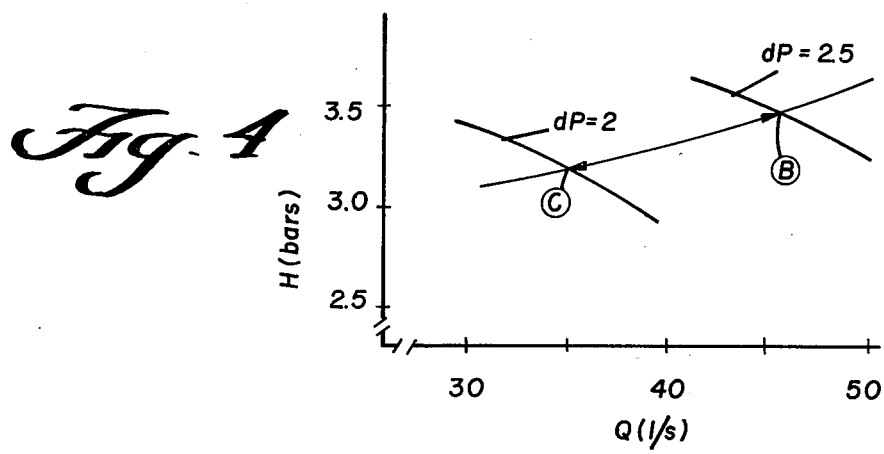

Q/H curves according to Example 1 are shown in FIG. 3.

By controlling dP—again by controlling the valve 27—utilizing the system in FIG. 5, it is possible to vary the pump flow rate Q. For instance the following comparative results are achieved by controlling dP as indicated:

| Parameter | Units | Case C | Case B |
|---|---|---|---|
| Pump speed | rpm | 3000 | 3000 l/s |
| Q | l/s | 35 | 46 |
| Back pressure | bars | 3.2 | 3.5 |
| dP | mWc | 2.0 | 2.5 |
| Pump power consumption | kW | 58 | 65 |

It will thus be seen that according to the present invention a method and apparatus are provided for effectively advantageously controlling the operation of a centrifugal pump. By effecting control according to the present invention it is possible to reduce pump power consumption dramatically for a predetermined pump flow rate, and to effect control of Q for relatively high consistency suspensions (e.g. about 8 to 12 percent) in much the same manner that speed control is utilized for conventional centrifugal pumps, while still insuring that the suspension is always fluidized.

While the invention has been herein shown and described on what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method for controlling the operation of a centrifugal pump pumping a suspension having a consistency of about 8-12 percent and containing gas, the pump having an inlet suspension pressure, a pressure head, and a suspension discharge flow rate, comprising the steps of:
   (a) effecting rotation of the suspension within the pump so that a gas bubble is created in a central part of the pump;
   (b) discharging gas from the gas bubble in the pump central part, at a gas discharge pressure;
   (c) rotating the pump impeller at a speed sufficient to effect fluidization of the suspension, and effecting discharge of the fluidized suspension at a flow rate;
   (d) determining the differential pressure between the suspension inlet pressure and the gas discharge pressure; and
   (e) controlling the head and/or discharge flow rate of the pump by controlling the differential pressure determined in step (d).

2. A method as recited in claim 1 wherein step (e) is practiced by controlling the discharge rate of gas in (b).

3. A method as recited in claim 2 wherein the flow rate of discharged gas is controlled by applying a suction force on the gas to effect discharge thereof, and metering the volume of gas passing through said suction source.

4. A method as recited in claim 1 wherein the discharge rate of the flow of the fluidized suspension is maintained substantially constant by measuring the flow at a particular point in the discharge line from the pump; and controlling a valve in the discharge line upstream of said point, in response to the flow rate measurement to maintain the discharge rate substantially constant.

5. A method as recited in claim 1 wherein step (b) is practiced by discharging the gas into an air vessel distinct from the pump, the motive force for effecting discharge of the gas to the gas vessel being provided by applying a suction source on the gas downstream of the air vessel.

6. A method as recited in claim 5 comprising the further step of, at start up of the centrifugal pump, or where a rapid pressure change is desired, automatically feeding air—from a source independent of the pump gas discharge—at a controlled pressure and flow rate to the air vessel; and wherein the gas discharge pressure utilized for determining the differential pressure set forth in step (d) is determined in the air vessel.

7. A method as recited in claim 1 wherein step (b) is practiced by discharging gas to an air vessel; and wherein the gas discharge pressure set forth in step (d) is determined by measuring the gas pressure in the air vessel.

8. A method as recited in claim 1 wherein the pump central part from which gas is discharged comprises an gas chamber directly connected to a gas discharge pipe; and comprising the further step of periodically flushing materials that collect in the gas chamber by supplying a liquid under pressure to the gas chamber.

9. A method for controlling the operation of a centrifugal pump pumping a cellulosic fiber suspension having a consistency of about 8-12 percent, and having gas entrained therein, comprising the steps of:
   (a) effecting rotation of the suspension so that a gas bubble is created in a central part of the pump;
   (b) effecing discharge of gas from the central part of the pump;
   (c) rotating the pump impeller at a speed sufficient to effect fluidization of the suspension, and effecting discharge of the fluidized suspension at a flow rate;
   (d) determining the differential pressure between the suspension just prior to fluidization thereof and the gas being discharged;
   (e) maintaining the rotational speed of the pump substantially constant and the discharge flow rate of the fluidized suspension substantially constant; and
   (f) significantly reducing the power consumption of the pump by controlling the pump head, which is accomplished by controlling the differential pressure determined in step (d).

10. A method as recited in claim 9 wherein the discharge rate of the flow of the fluidized suspension is maintained substantially constant by measuring the flow at a particular point in the discharge line from the pump; and controlling a valve in the discharge line upstream of said point, in response to the flow rate measurement, to maintain the discharge rate substantially constant.

11. A method as recited in claim 10 wherein step (f) is practiced by measuring the difference in pressure between the suspension just prior to fluidization, and the fluidized suspension when discharged from the pump; determining a set value in response to the measured pressure difference; and controlling the gas discharge rate so that the differential pressure between the suspension just prior to fluidization thereof and the gas being discharged is approximately at said set value.

12. A method as recited in claim 9 wherein step (f) is practiced by measuring the difference in pressure between the suspension just prior to fluidization, and the fluidized suspension when discharged from the pump; determining a set value in response to the measured pressure difference; and controlling the gas discharge rate so that the differential pressure between the suspension just prior to fluidization thereof and the gas being discharged is approximately at said set value.

13. A method as recited in claim 9 wherein step (b) is practiced by discharging gas to an air vessel; and wherein the gas discharge pressure set forth in step (d) is determined by measuring the gas pressure in the air vessel.

14. A method for controlling the operation of a centrifugal pump pumping a suspension having a consistency of about 8-12 percent and containing gas, the pump having an inlet suspension pressure, a pressure head, a suspension discharge flow rate, and a suspension discharge pressure, comprising the steps of:
   (a) effecting rotation of the suspension within the pump so that a gas bubble is created in a central part of the pump;
   (b) discharging gas from the gas bubble in the pump central part, at a gas discharge pressure;
   (c) rotating the pump impeller at a speed sufficient to effect fluidization of the suspension, and effecting discharge of the fluidized suspension at a flow rate;
   (d) determining the differential pressure between the suspension inlet pressure and the suspension discharge pressure;
   (e) determining a differential pressure set value in response to the differential pressure measured in step (d); and
   (f) controlling the differential pressure between the suspension inlet pressure and the gas discharge pressure so that said differential pressure is approximately said differential pressure set value.

15. A method as recited in claim 14 wherein step (f) is practiced by applying a suction force to the gas to effect discharge thereof, and metering the volume of gas passing under the influence of the suction force to thereby control the gas discharge rate.

16. A method as recited in claim 14 wherein the discharge rate of the flow of the fluidized suspension is maintained substantially constant by measuring the flow at a particular point in the discharge line from the pump; and controlling a valve in the discharge line upstream of said point, in response to the flow rate measurement to maintain the discharge rate substantially constant.

17. A method as recited in claim 14 wherein step (b) is practiced by discharging gas to an air vessel; and wherein the gas discharge pressure set forth in step (f) is determined by measuring the gas pressure in the air vessel.

18. A method for controlling the operation of a centrifugal pump pumping a liquid or suspension containing gas, the pump having an inlet liquid or suspension pressure, a pressure head, and a liquid or suspension discharge flow rate, comprising the steps of:
(a) effecting rotation of the liquid or suspension within the pump so that a gas bubble is created in a central part of the pump;
(b) discharging gas from the gas bubble in the pump central part, at a gas discharge pressure, to an air vessel;
(c) determining the differential pressure between the liquid or suspension inlet pressure and the gas discharge pressure, the gas discharge pressure measured in the air vessel;
(d) controlling the head and/or discharge flow rate of the pump by controlling the differential pressure determined in step (c); and
(e) at pump start up, or when a rapid differential pressure change is desired, feeding air at a controlled pressure and flow rate—from a source independent of the pump gas discharge—to the air vessel.

19. Apparatus for controlling the operation of a centrifugal pump pumping a suspension having gas entrained therein, comprising: a centrifugal pump having a suspension chamber with an impeller disposed therein, and a gas chamber in fluid communication with said suspension chamber and having rotating blades disposed therein;
a suspension inlet to said suspension chamber, and a suspension outlet from said suspension chamber;
a gas outlet from said gas chamber;
means for measuring the flow in said suspension discharge line at a particular point;
a valve in said suspension discharge line upstream of said particular point;
means for determining the differential pressure between the suspension in said suspension chamber and the gas discharge in said discharge line; and
means for controlling said valve in said suspension discharge line in response to the flow rate measurement by said flow measuring means, to maintain the suspension discharge rate substantially constant.

20. Apparatus as recited in claim 19 further comprising: an air vessel operatively connected to said gas discharge line; means for measuring the gas discharge pressure for determining the differential pressure between the suspension in said suspension chamber and the gas being discharged; and a suction source downstream of said air vessel and operatively connected thereto for providing the motive force for effecting discharge of gas to the gas vessel.

21. Apparatus as recited in claim 20 further comprising valve means disposed in said gas discharge conduit between said air vessel and said pump gas chamber.

22. Apparatus as recited in claim 20 further comprising means for automatically feeding gas from a source independent of said pump gas discharge line at a controlled pressure and flow rate to said air vessel.

23. Apparatus for controlling the operation of a centrifugal pump pumping a suspension, comprising:
said pump having a suspension chamber with an impeller, and a gas chamber in fluid communication with said suspension chamber, and rotatable blades in said gas chamber;
an inlet to said suspension chamber, and an outlet from said suspension chamber;
a gas discharge outlet from said gas chamber;
an air vessel disposed in said gas discharge outlet;
means for sensing the suspension inlet pressure;
means for sensing the gas discharge pressure in said air vessel;
means for determining the differential pressure between said sensed suspension inlet pressure and gas discharge pressure; and
means for controlling the head and/or discharge flow rate of the pump by controlling the determined differential pressure.

24. Apparatus as recited in claim 23, further comprising a suction source disposed in operative communication with said air vessel, said suction source providing the motive force for effecting discharge of the gas from the pump gas chamber to said air vessel.

25. Apparatus as recited in claim 23 further comprising means for automatically feeding gas from a source independent of said pump gas discharge line at a controlled pressure and flow rate to said air vessel.

* * * * *